(12) United States Patent
Davila et al.

(10) Patent No.: US 11,021,949 B2
(45) Date of Patent: Jun. 1, 2021

(54) TIMELINE VISUALIZATION OF EVENTS FOR MONITORING WELL SITE DRILLING OPERATIONS

(71) Applicant: Halliburton Energy Services, Inc., Houston, TX (US)

(72) Inventors: Michael J. Davila, Houston, TX (US); Dorinne D. Hammons, Pearland, TX (US); Ron Vutpakdi, Missouri City, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 363 days.

(21) Appl. No.: 15/557,051

(22) PCT Filed: May 13, 2015

(86) PCT No.: PCT/US2015/030642
§ 371 (c)(1),
(2) Date: Sep. 8, 2017

(87) PCT Pub. No.: WO2016/182570
PCT Pub. Date: Nov. 17, 2016

(65) Prior Publication Data
US 2018/0066517 A1 Mar. 8, 2018

(51) Int. Cl.
*G06F 3/048* (2013.01)
*E21B 49/00* (2006.01)
(Continued)

(52) U.S. Cl.
CPC ............ *E21B 49/003* (2013.01); *E21B 44/00* (2013.01); *E21B 47/06* (2013.01); *E21B 47/12* (2013.01);
(Continued)

(58) Field of Classification Search
CPC ....... G06F 3/0481–0489; G06F 3/0484; G06F 3/04847; G06F 9/451; G06F 16/447;
(Continued)

(56) References Cited

U.S. PATENT DOCUMENTS 5,358,058 A * 10/1994 Edlund ................... E21B 44/00
175/24
5,952,569 A 9/1999 Jervis et al.
(Continued)

OTHER PUBLICATIONS

European Patent Office, Supplementary European Search Report, Application 15892027.2, dated Dec. 13, 2018, 7 pages, Europe.
(Continued)

*Primary Examiner* — Steven B Theriault

(57) ABSTRACT

System and methods for monitoring well site drilling operations using event detection and visualization are provided. Well site data related to a drilling operation is obtained from one or more data sources. Values of one or more wellsite parameters are monitored over a current time period during the drilling operation, based on the obtained well site data. Upon detecting at least one event of interest occurring during the current time period, based on the monitored values, an interactive timeline visualization of the detected event of interest is provided for display to a user relative to a duration of the drilling operation.

20 Claims, 10 Drawing Sheets

US 11,021,949 B2
Page 2

(51) Int. Cl.
*E21B 44/00* (2006.01)
*E21B 47/06* (2012.01)
*E21B 47/12* (2012.01)
*G01V 3/18* (2006.01)
*G06F 3/0484* (2013.01)
*G06F 3/0481* (2013.01)
*G06F 16/44* (2019.01)

(52) U.S. Cl.
CPC .............. *G01V 3/18* (2013.01); *G06F 3/0484* (2013.01); *G06F 3/04815* (2013.01); *G06F 16/447* (2019.01)

(58) Field of Classification Search
CPC .... G06F 3/04815; E21B 49/003; E21B 44/00; E21B 47/06; E21B 47/12; E21B 47/00; G01V 3/18; G06Q 50/00
See application file for complete search history.

(56) References Cited

U.S. PATENT DOCUMENTS

| | | | |
|---|---|---|---|
| 6,144,375 A | 11/2000 | Jain et al. | |
| 6,654,691 B2 | 11/2003 | Metrick | |
| 6,760,665 B1* | 7/2004 | Francis | G01V 1/40 702/16 |
| 6,950,989 B2 | 9/2005 | Rosenzweig et al. | |
| 7,003,439 B2 | 2/2006 | Aldred et al. | |
| 7,181,686 B1 | 2/2007 | Bahrs | |
| 7,584,165 B2* | 9/2009 | Buchan | G06Q 10/06 706/60 |
| 7,596,481 B2 | 9/2009 | Zamora et al. | |
| 7,735,018 B2 | 6/2010 | Bakhash | |
| 7,813,898 B2* | 10/2010 | Parker | G01D 7/04 702/187 |
| 7,925,298 B2 | 4/2011 | Chen et al. | |
| 7,953,619 B2 | 5/2011 | Heredia et al. | |
| 8,121,971 B2* | 2/2012 | Edwards | G06N 5/025 706/50 |
| 8,170,800 B2* | 5/2012 | Aamodt | E21B 44/00 702/9 |
| 8,260,631 B2 | 9/2012 | Morita et al. | |
| 8,361,543 B2 | 1/2013 | Nielsen et al. | |
| 8,533,598 B2 | 9/2013 | Meaney et al. | |
| 8,553,039 B1* | 10/2013 | Boice | G06T 13/00 345/473 |
| 8,554,483 B2* | 10/2013 | Valero | E21B 47/00 702/7 |
| 8,560,946 B2* | 10/2013 | Fugitt | G06F 3/0481 345/440 |
| 8,596,385 B2 | 12/2013 | Benson et al. | |
| 8,601,388 B2 | 12/2013 | Barrios et al. | |
| 8,705,318 B2* | 4/2014 | Zheng | G01V 1/42 367/81 |
| 8,775,087 B1* | 7/2014 | Selman | G01V 1/46 166/264 |
| 9,177,399 B2* | 11/2015 | Williams | G06T 11/206 |
| 9,512,707 B1* | 12/2016 | Bermudez Martinez | E21B 44/00 |
| 9,518,459 B1* | 12/2016 | Bermudez Martinez | E21B 47/007 |
| 9,519,692 B2* | 12/2016 | Chow | G06F 16/2477 |
| 9,946,445 B2* | 4/2018 | Whalley | E21B 44/00 |
| 9,957,781 B2* | 5/2018 | Vennelakanti | E21B 43/00 |
| 10,049,474 B2* | 8/2018 | Germain | E21B 41/00 |
| 10,260,332 B2* | 4/2019 | Israel | E21B 44/00 |
| 10,282,382 B2* | 5/2019 | Samuel | E21B 44/00 |
| 10,323,502 B2* | 6/2019 | Andresen | E21B 47/00 |
| 10,428,647 B1* | 10/2019 | Bermudez Martinez | G01V 11/002 |
| 2002/0050989 A1* | 5/2002 | Sanstrom | E21B 44/00 345/419 |
| 2002/0103630 A1* | 8/2002 | Aldred | E21B 44/00 703/10 |
| 2004/0124009 A1* | 7/2004 | Hoteit | G06N 7/005 175/25 |
| 2004/0124012 A1 | 7/2004 | Dunlop et al. | |
| 2006/0238538 A1* | 10/2006 | Kapler | G06Q 10/06 345/440 |
| 2006/0239118 A1* | 10/2006 | Guidry | G01V 1/34 367/68 |
| 2007/0056727 A1* | 3/2007 | Newman | E21B 41/00 166/250.01 |
| 2007/0185655 A1* | 8/2007 | Le Bemadjiel | E21B 43/04 702/6 |
| 2007/0245238 A1 | 10/2007 | Fugitt et al. | |
| 2008/0097735 A1* | 4/2008 | Ibrahim | E21B 49/005 703/10 |
| 2008/0179094 A1* | 7/2008 | Repin | E21B 44/00 175/50 |
| 2008/0294606 A1* | 11/2008 | Moran | G06F 40/14 |
| 2008/0294663 A1* | 11/2008 | Heinley | G11B 27/34 |
| 2009/0058674 A1* | 3/2009 | Papouras | E21B 47/00 340/853.2 |
| 2009/0105059 A1* | 4/2009 | Dorry | B04B 1/2016 494/37 |
| 2009/0132458 A1* | 5/2009 | Edwards | E21B 44/00 706/50 |
| 2009/0222286 A1 | 9/2009 | Elsholz | |
| 2009/0229819 A1* | 9/2009 | Repin | G06T 19/00 166/250.01 |
| 2010/0185984 A1* | 7/2010 | Wright | G06F 16/29 715/833 |
| 2010/0206559 A1* | 8/2010 | Sequeira, Jr. | E21B 41/00 166/250.15 |
| 2010/0281381 A1 | 11/2010 | Meaney et al. | |
| 2011/0067882 A1 | 3/2011 | Yerlazarian et al. | |
| 2011/0175899 A1* | 7/2011 | Bittar | G06T 19/00 345/419 |
| 2011/0202866 A1* | 8/2011 | Huang | G06F 3/04883 715/779 |
| 2012/0054246 A1* | 3/2012 | Fischer | G06F 16/319 707/793 |
| 2012/0143899 A1* | 6/2012 | Arango | E21B 49/00 707/769 |
| 2013/0080062 A1 | 3/2013 | Aamodt et al. | |
| 2013/0083031 A1* | 4/2013 | Lehnherr | G06Q 10/06 345/440 |
| 2013/0144531 A1* | 6/2013 | Johnston | E21B 44/00 702/9 |
| 2013/0161096 A1* | 6/2013 | Benson | E21B 7/04 175/26 |
| 2013/0173505 A1* | 7/2013 | Balogun | E21B 43/121 706/12 |
| 2013/0341093 A1* | 12/2013 | Jardine | E21B 44/00 175/40 |
| 2014/0083688 A1 | 3/2014 | Rojas et al. | |
| 2014/0110167 A1* | 4/2014 | Goebel | E21B 44/00 175/24 |
| 2014/0118334 A1* | 5/2014 | Guijt | G06T 11/206 345/419 |
| 2014/0223334 A1 | 8/2014 | Jensen et al. | |
| 2014/0246238 A1* | 9/2014 | Abbassian | E21B 44/00 175/40 |
| 2014/0279948 A1* | 9/2014 | Mahate | G06Q 10/10 707/692 |
| 2015/0134257 A1* | 5/2015 | Erge | E21B 44/00 702/9 |
| 2015/0300151 A1* | 10/2015 | Mohaghegh | E21B 47/10 702/9 |
| 2015/0365635 A1* | 12/2015 | Jose | H04N 7/18 348/14.07 |
| 2016/0053604 A1* | 2/2016 | Abbassian | E21B 44/00 702/6 |
| 2016/0069182 A1* | 3/2016 | Neale | E21B 49/006 166/254.2 |
| 2016/0147774 A1* | 5/2016 | Xiao-Devins | G06F 16/438 707/722 |
| 2016/0162519 A1* | 6/2016 | Stowe | G06F 16/217 707/755 |

(56) References Cited

U.S. PATENT DOCUMENTS

2016/0186531 A1* 6/2016 Harkless ................ E21B 44/00
                                                        702/6
2016/0274781 A1* 9/2016 Wilson ................ G06F 3/04817
2016/0305230 A1* 10/2016 Benson ................ E21B 47/024

OTHER PUBLICATIONS

Omar Alonso, Michael Gertz, Ricardo Baeza-Yates, Search Results using Timeline Visualizations, Jul. 23-27, 2007, 1 page, SIGIR'07, ACM 978-1-59593-597-7/07/0007, Amsterdam, The Netherlands.

Scott S. Potter and David D. Woods, Event Driven Timeline Displays: Beyond Message Lists in Human-Intelligent System Interaction, Oct. 13, 1991, 6 pages, vol. 2, 1991 IEEE International Conference on Systems, Man, and Cybernetics.

Gerald M. Karam, Visualization using Timelines, Aug. 1994, 13 pages, 1994 ACM SIGSOFT International Symposium: Software Testing & Analysis.

Jian Zhao, Steven M. Drucker, Danyel Fisher, Donald Brinkman, TimeSlice: Interactive Faceted Browsing of Timeline Data, May 25, 2012, 4 pages, AVI'12, Capri Island, Italy.

Korean Intellectual Property Office, International Search Report and Written Opinion, dated Feb. 2, 2016, 13 pages, Korea.

* cited by examiner

TIMELINE VISUALIZATION OF EVENTS FOR MONITORING WELL SITE DRILLING OPERATIONS

CROSS-REFERENCE TO RELATED APPLICATIONS

This application is a U.S. national stage patent application of International Patent Application No. PCT/US2015/030642, filed on May 13, 2015, the benefit of which is claimed and the disclosure of which is incorporated herein by reference in its entirety.

FIELD OF THE DISCLOSURE

The present disclosure relates generally to monitoring tools for drilling operations at a wellsite, and particularly, to monitoring tools for detecting events of interest during a drilling operation at the wellsite.

BACKGROUND

During a drilling operation, the drilling properties are sensed over time, either continuously or intermittently. Thus, data related to the drilling properties is available over time, and the behavior of each drilling parameter can be evaluated in real time. For example, an operator at a wellsite may use an event monitoring utility to monitor the behavior of selected drilling parameters of interest.

Events that occur during the drilling operation may include normal, expected events, in which case it would be desirable to control the drilling operation based on identification of such events sometime after they have occurred. It is also desirable in the drilling operation for certain events to be identified as soon as they occur, so that any needed remedial measures may be taken as soon as possible. As conventional event monitoring and reporting tools generally display information related to an event as a list or a table of relevant drilling parameter values, it may be difficult to quickly ascertain when relevant events of interest occur during the course of the drilling operation using such tools.

DESCRIPTION OF ILLUSTRATIVE EMBODIMENTS

Figure 1:
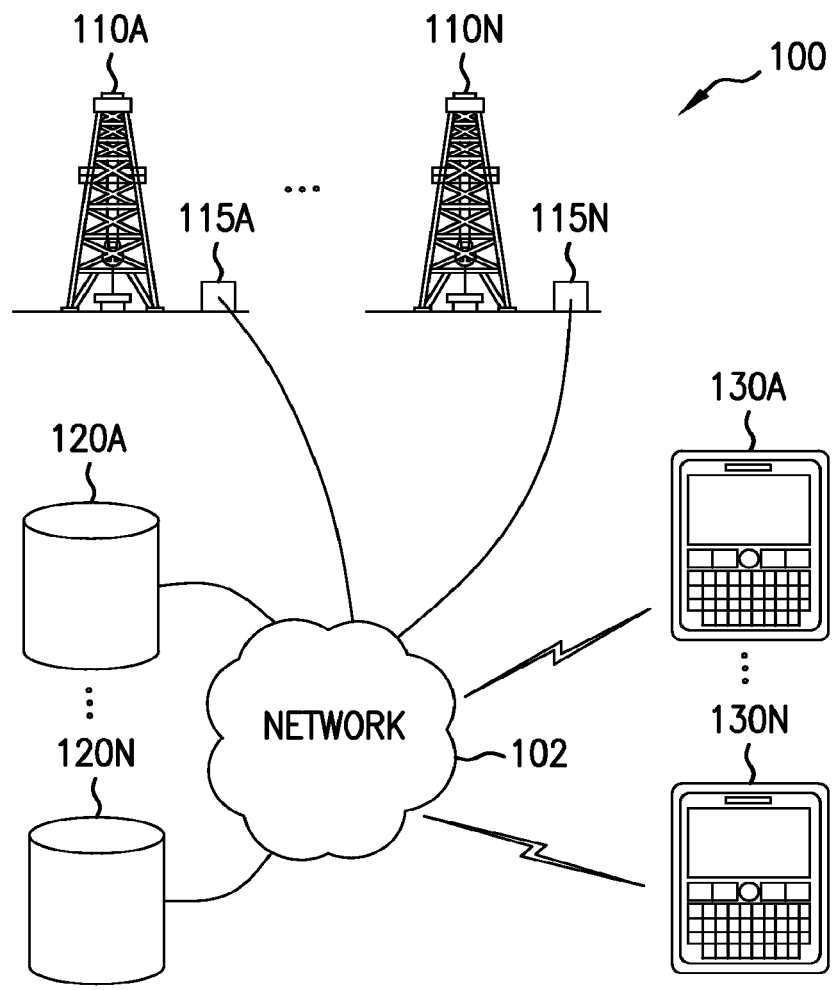
FIG. 1 is a diagram of an exemplary network environment for monitoring well site operations.

Embodiments of the present disclosure relate to event detection and visualization techniques for monitoring well site operations. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosure may repeat reference numerals and/or letters in the various examples or Figures. This repetition is for the purpose of simplicity and clarity and does not in itself dictate a relationship between the various embodiments and/or configurations discussed. Further, spatially relative terms, such as beneath, below, lower, above, upper, uphole, downhole, upstream, downstream, and the like, may be used herein for ease of description to describe one element or feature's relationship to another element(s) or feature(s) as illustrated, the upward direction being toward the top of the corresponding figure and the downward direction being toward the bottom of the corresponding figure, the uphole direction being toward the surface of the wellbore, the downhole direction being toward the toe of the wellbore. Unless otherwise stated, the spatially relative terms are intended to encompass different orientations of the apparatus in use or operation in addition to the orientation depicted in the Figures. For example, if an apparatus in the Figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Moreover even though a Figure may depict a horizontal wellbore or a vertical wellbore, unless indicated otherwise, it should be understood by those skilled in the art that the apparatus according to the present disclosure is equally well suited for use in wellbores having other orientations including vertical wellbores, slanted wellbores, multilateral wellbores or the like. Likewise, unless otherwise noted, even though a Figure may depict an onshore operation, it should be understood by those skilled in the art that the apparatus according to the present disclosure is equally well suited for use in offshore operations. Further, unless otherwise noted, even though a Figure may depict a cased hole, it should be understood by those skilled in the art that the apparatus according to the present disclosure is equally well suited for use in open hole operations.

The term "wellsite data" is used herein to refer to the different types of data that may be produced and collected from different sources at one or more wellsites in a petroleum field. Such data may relate to activities performed at any of the various stages of a well's life cycle including, for example, well planning, drilling, and completion. Examples of such activities include, but are not limited to, daily operations, casing, cementing, perforations, stimulations, pipe tally, and testing of wellbore equipment. As noted above, the wellsite data produced in the field may be from a number of different sources at the wellsite. Such data sources may be associated with different service providers, e.g., service companies and/or specialized contractors, that may be involved in the various operations at the wellsite including, for example, drilling, surveying, wireline testing, completions, production, oilfield planning and analysis. Examples of different sources of wellsite data include, but are not limited to, sensors or other instrumentation devices on a drilling rig in addition to various types of computing devices used by service providers in the field for collecting and reporting data related to inventory tracking (e.g., pipe tally reports) and other activities performed at the wellsite (e.g., daily operations reports). Each service provider may use its own proprietary computer systems, networks, and electronic data formats for representing, storing, and managing wellsite data generally.

As noted above, embodiments of the present disclosure relate to event detection and visualization techniques for monitoring well site operations. In an embodiment, an interactive graphical user interface (GUI) is provided for displaying a representation of stored information and events that occur during a drilling operation at a wellsite. The representation may include visual markers on a timeline indicating when the events occurred relative to a duration of the drilling operation. As will be described in further detail below, the displayed representation may include representations of each event and an underlying chart that displays relevant data, such as a rate of penetration (ROP) or depth, which may vary over the course of the drilling operation. The event markers displayed for the events may vary in shape, color, etc. based on the type of event and, when selected by a user, may display additional information relevant to the corresponding event within an event details window (that also may vary by type of event). Accordingly, embodiments may enable the user to easily view and navigate through the stored information as well as interactively analyzing the contents of the stored information and events using event markers on a timeline and an underlying chart that displays selected data relevant to the drilling operation.

Illustrative embodiments and related methodologies of the present disclosure will be described below in reference to FIGS. 1-10 as they might be employed, for example, in a computer system for monitoring drilling operations using event detection and timeline visualization. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

FIG. 1 illustrates an exemplary network environment 100 for monitoring drilling operations at one or more well sites in a petroleum field. As shown in FIG. 1, the petroleum field in this example may include a plurality of drilling rigs 110A-110N ("drilling rigs 110A-N") for conducting drilling operations at multiple wellsites throughout the field, e.g., for purposes of hydrocarbon exploration, production, or stimulation. In an embodiment, each of drilling rigs 110A-N may be equipped with a variety of instrumentation devices, e.g., various downhole or surface sensors, for collecting wellsite data related to different drilling parameters of interest during the drilling operation at each wellsite, as described above. The collected data may be transferred from each of drilling rigs 110A-N to corresponding wellsite data processing systems 115A-115N ("processing systems 115A-N") for processing and storing the wellsite data in a local data store.

In an embodiment, the local data store and each of processing systems 115A-N may be components of a surface control unit of a wireline or logging system associated with the drilling rig at each wellsite. As will be described in further detail below with respect to FIG. 2, such a wireline/logging system may be part of an overall drilling system including the drilling rig. In the example shown in FIG. 1, processing systems 115A-N of such a surface control unit may be used to provide different kinds of functionality to drilling rig operators at each wellsite. Such functionality may include, for example and without limitation, wellsite monitoring and control functionality that operators of drilling rigs 110A-N can use to monitor the status of various drilling parameters during wellsite operations based on the data obtained from each drilling rig and make appropriate adjustments to controls of the drilling rig system or components thereof at each wellsite. A rig operator may access such functionality via, for example, a computer terminal or workstation interface of the surface control unit at each wellsite.

In a further embodiment, processing systems 115A-N may transmit the wellsite data via a network 102 for storage in one or more remote databases 120A-120N ("databases 120A-N"). While not shown in FIG. 1, databases 120A-N may be part of a centralized data processing and management system including one or more servers communicatively coupled to databases 120A-N. For example, processing systems 115A-N may transmit the wellsite data collected from drilling rigs 110A-N to the server(s) of the centralized data processing system via network 102. The server(s) may process the wellsite data received from processing systems 115A-N and store the processed data within databases 120A-N. The centralized data processing system may provide, for example, remote wellsite data reporting and monitoring functionality for the petroleum field as a whole. Such functionality may be similar to those provided by processing systems 115A-N for the individual wellsites, as described above.

In an example, such functionality may be provided by a wellsite monitoring service hosted by the server(s) of the centralized data processing system described above. Such a monitoring service may be accessible via network 102 to operators of drilling rigs 110A-N using, for example, a remote wellsite monitoring application executable at one or more computing devices 130A-130N ("devices 130A-N"). As will be described in further detail below, the wellsite monitoring application may provide a user, e.g., drilling rig operator, at each of devices 130A-N with a GUI including one or more viewer windows or "dashboards" for viewing processed wellsite data related to various activities or events of interest that may occur at a wellsite during wellsite operations.

While only devices 130A-N are shown in FIG. 1, it should be noted that the techniques disclosed herein may be applied to any number of computing devices of various types. each of devices 130A-N may be implemented using any type of computing device having at least one processor and a memory in the form of a computer-readable storage medium for storing data and instructions that can be read and executed by the processor. Such a computing device may also include an input/output (I/O) interface for receiving input or commands via a user input device (e.g., a mouse, QWERTY or T9 keyboard, touchscreen, or microphone) and for outputting or presenting information to the user via a display (e.g., a touchscreen or monitor). Examples of such a computing device may include, but are not limited to, a desktop or personal computer, workstation, a laptop, tablet, smartphone, personal digital assistant (PDA) or similar type of device.

Network 102 can be any network or combination of networks that can carry data communication. Such a network may include, but is not limited to, a wired or wireless network in addition to a local area network, medium area network, or wide area network, such as the Internet. Network 102 may support any of various communication protocols and technologies, e.g., Hypertext Transfer Protocol (HTTP), HTTP Secured (HTTPS), Application Data Interface (ADI), Well Information Transfer Standard Markup Language (WITSML), etc.). It should be appreciated that network 102 may include any number of intermediate network routers, gateways, or servers for enabling data communications between the various devices and systems within network environment 100.

Figure 2:
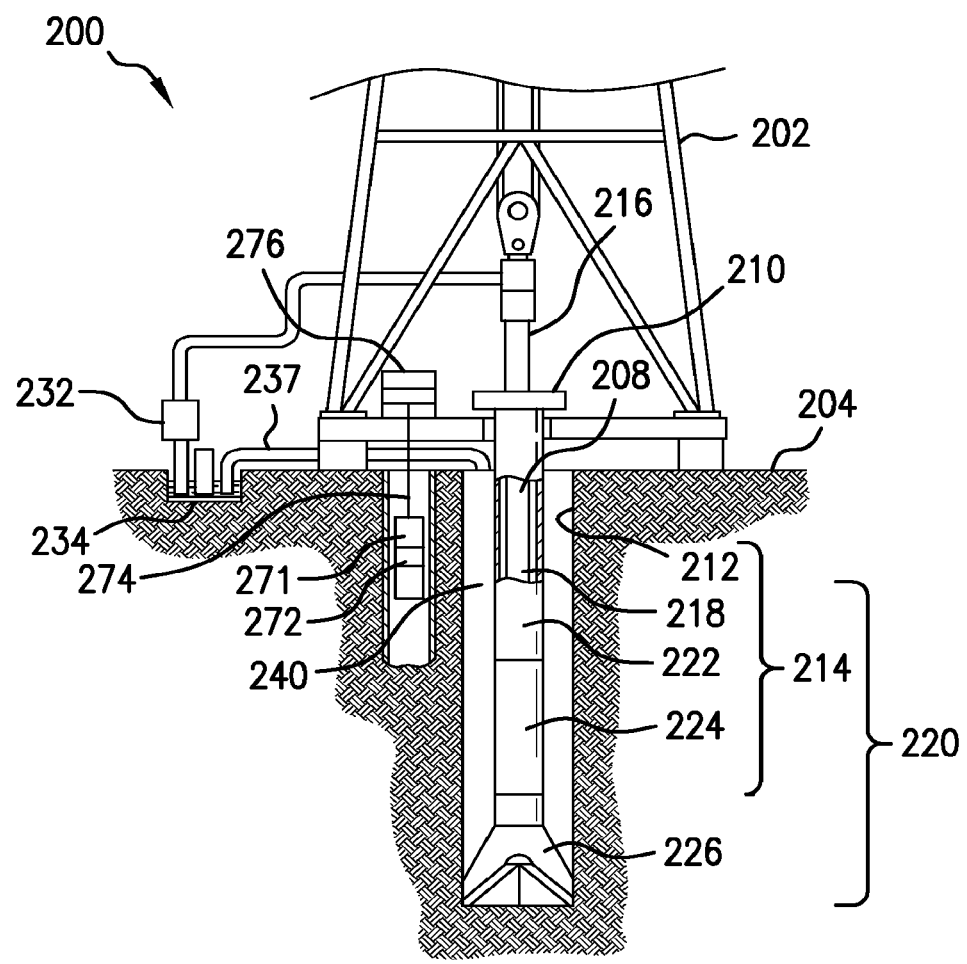
FIG. 2 is a diagram of an exemplary drilling system for conducting various operations at a well site.

In one example, each of drilling rigs 110A-N and processing systems 115A-N may be part of a drilling system, as shown in FIG. 2. FIG. 2 illustrates an example of a drilling system 200 for conducting various operations at a wellsite. Examples of such operations may include, but are not limited to, drilling, logging, production, completion or other operations. Thus, system 200 can include one or more subsystems for performing one or any combination of such operations. As shown in FIG. 2, system 200 includes a drilling rig 202 located at a surface 204 of a wellbore. Drilling rig 202 provides support for a downhole apparatus, including a drill string 208. Drill string 208 penetrates a rotary table 210 for drilling a borehole/wellbore 212 through subsurface formations 214. Drill string 208 includes a Kelly 216 (in the upper portion), a drill pipe 218 and a bottomhole assembly 220 (located at the lower portion of drill pipe 218). In certain illustrative embodiments, bottomhole assembly 220 may include drill collars 222, a downhole tool 224 and a drill bit 226. Although downhole tool 224 may be any of a number of different types of tools including measurement-while-drilling ("MWD") tools, logging-while-drilling ("LWD") tools, etc., in this embodiment downhole tool 224 is any one of the electromagnetic field measuring devices described herein.

During drilling operations, drill string 208 (including Kelly 216, drill pipe 218 and bottom hole assembly 220) may be rotated by rotary table 210. In addition or alternative to such rotation, bottom hole assembly 220 may also be rotated by a motor that is downhole. Drill collars 222 may be used to add weight to drill bit 226. Drill collars 222 also optionally stiffen bottom hole assembly 220 allowing it to transfer the weight to drill bit 226. The weight provided by drill collars 222 also assists drill bit 226 in the penetration of surface 204 and subsurface formations 214.

During drilling operations, a mud pump 232 optionally pumps drilling fluid (e.g., drilling mud), from a mud pit 234 through a hose 236, into drill pipe 218, and down to drill bit 226. The drilling fluid can flow out from drill bit 226 and return back to the surface through an annular area 240 between drill pipe 218 and the sides of borehole 212. The drilling fluid may then be returned to the mud pit 234, for example via pipe 237, and the fluid is filtered. The drilling fluid cools drill bit 226, as well as provides for lubrication of drill bit 226 during the drilling operation. Additionally, the drilling fluid removes the cuttings of subsurface formations 214 created by drill bit 226.

Still referring to FIG. 2, downhole tool 224 may also include any number of sensors which monitor different downhole parameters and generate data that is stored within one or more different storage mediums within the downhole tool 224. Alternatively, however, the data may be transmitted to a remote location (e.g., surface) and processed accordingly. Such parameters may include logging data related to the various characteristics of the subsurface formations (such as resistivity, radiation, density, porosity, etc.) and/or the characteristics of the borehole (e.g., size, shape, etc.), etc.

FIG. 2 also illustrates an alternative embodiment in which a wireline system is deployed. In such an embodiment, the wireline system may include a downhole tool body 271 coupled to a base 276 by a logging cable 274. Logging cable 274 may include, but is not limited to, a wireline (multiple power and communication lines), a mono-cable (a single conductor), and a slick-line (no conductors for power or communications). Base 276 is positioned above ground and optionally includes support devices, communication devices, and computing devices. Tool body 271 houses any one of the electromagnetic field measurement devices 272 described herein. In an embodiment, a power source (not shown) is positioned in tool body 271 to provide power to the tool 271. In operation, the wireline system is typically sent downhole after the completion of a portion of the drilling. More specifically, in certain methods, drill string 208 creates borehole 212, then drill string 208 is removed, and the wireline system is inserted into borehole 212, as will be understood by those of ordinary skill in the relevant art having the benefit of this disclosure. Note that only one borehole is shown for simplicity in order to show the tools deployed in drilling and wireline applications. In certain applications, such as ranging, multiple boreholes may be drilled as understood in the art.

In an embodiment, base 276 may be used to house a surface control unit at the well site. Such a surface control unit may include, for example, a data processing system, e.g., any of processing systems 115A-N of FIG. 1, as described above. The data processing system may be used to process and store data collected at the well site, e.g., by electromagnetic field measurement devices 272. Additionally, the data processing system may be used to transfer the well site data via a communication network (e.g., network 102 of FIG. 1) to a remote part of a centralized data processing and management system, as described above and as will be described in further detail below with respect to FIG. 3.

Figure 3:
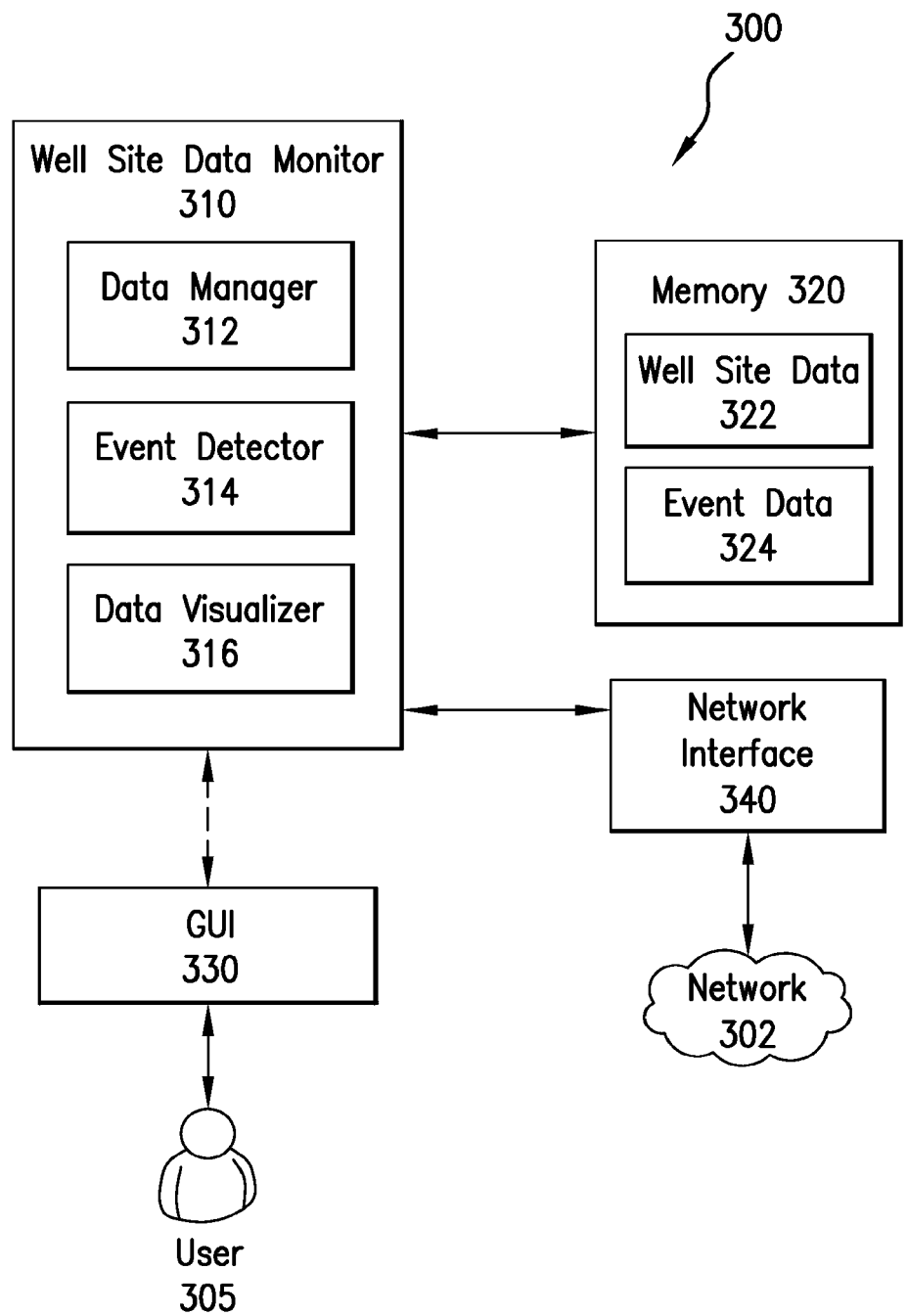
FIG. 3 is a block diagram of an exemplary system for monitoring well site drilling operations using event detection and timeline visualization.

FIG. 3 is a block diagram of an exemplary data processing and management system 300 for monitoring well site drilling operations using timeline visualization of detected events. As shown in FIG. 3, system 300 includes a well site data monitor 310, a memory 320, a GUI 330 and a network interface 340. Well site data monitor 310 includes a data manager 312, an event detector 314 and a data visualizer 316. In an embodiment, well site data monitor 310 along with its components (including data manager 312, event detector 314 and data visualizer 316), memory 320, GUI 330 and network interface 340 may be communicatively coupled to each other via an internal bus of system 300.

In an embodiment, system 300 can be implemented using any type of computing device having at least one processor and a processor-readable storage medium for storing data and instructions executable by the processor. Such a computing device may also include an input/output (I/O) interface for receiving user input or commands via a user input device (not shown). The user input device may be, for example and without limitation, a mouse, a QWERTY or T9 keyboard, a touch-screen, a graphics tablet, or a microphone. The 110 interface also may be used by each computing device to output or present information to a user via an output device (not shown). The output device may be, for example, a display coupled to or integrated with the computing device for displaying a digital representation of the information being presented to the user. Examples of such a computing device include, but are not limited to, a mobile phone, a personal digital assistant (PDA), a tablet computer, a laptop computer, a desktop computer, a workstation, a cluster of computers, a set-top box, or similar type of computing device.

Although only well site data monitor 310, data manager 312, event detector 314, data visualizer 316, memory 320, GUI 330 and network interface 340 are shown in FIG. 3, it should be appreciated that system 300 may include additional components, modules, and/or sub-components as desired for a particular implementation. It should also be appreciated that the components of system 300, e.g., well site data monitor 310, or portions thereof, may be implemented in software, firmware, hardware, or any combination thereof. Furthermore, it should be appreciated that embodiments of well site data monitor 310, including data manager 312, event detector 314 and data visualizer 316, or portions thereof, can be implemented to run on any type of processing device including, but not limited to, a computer, workstation, embedded system, networked device, mobile device, or other type of processor or computer system capable of carrying out the functionality described herein.

In an embodiment, memory 320 can be used to store information accessible by well site data monitor 310 (and each of data manager 312, event detector 314 and data visualizer 316) for implementing the functionality of the present disclosure. Memory 320 may be any type of recording medium coupled to an integrated circuit that controls access to the recording medium. The recording medium can be, for example and without limitation, a semiconductor memory, a hard disk, or similar type of memory or storage device. In some implementations, memory 320 may be a remote data store, e.g., a cloud-based storage location, communicatively coupled to system 300 over a network 302 via network interface 340. Network 302 can be any type of network or combination of networks used to communicate information between different computing devices. Network 302 can include, but is not limited to, a wired (e.g., Ethernet) or a wireless (e.g., Wi-Fi or mobile telecommunications) network. In addition, network 302 can include, but is not limited to, a local area network, medium area network, and/or wide area network such as the Internet.

As shown in FIG. 3, memory 320 may be used to store well site data 322 and event data 324. However, it should be appreciated that memory 320 may also be used to store other types of data, as needed or desired for a particular implementation. Well site data 322 may include different types of data obtained from one or more data sources located at each well site in a petroleum field. Examples of such data sources include, but are not limited to, various downhole and surface sensors or other instrumentation devices on a drilling rig (e.g., any of drilling rigs 110A-N of FIG. 1, as described above). Other data sources may include, for example, well site data processing systems (e.g., data processing systems 115A-N of FIG. 1) for processing, storing and/or reporting data related to a drilling operation or other activity performed at each well site.

In an embodiment, well site data 322 may include measurements of one or more well site parameters obtained from one or more of the above-described data sources via network 302. In an example, such measurements may be collected by one or more downhole or surface sensors of the drilling rig and transferred to a memory of a data processing system for storage at the well site. In an embodiment, data manager 312 may use network interface 340 to obtain the well site parameter measurements from the data processing system in this example via network 302. The parameter measurements may be obtained by data manager 312 on a periodic basis, e.g., at predetermined intervals, or continuously, e.g., in real-time as the parameter measurements are collected by the sensors and transferred to the data processing system at the well site.

In some implementations, data manager 312 may receive an indication of newly collected data from the data processing system at the well site via network 302 and in response to the received indication, request new data from the data processing system. Alternatively, data manager 312 may periodically request any new data that may have been collected during different stages of the drilling operation. The obtained measurements may then be stored in memory 320 as a part of well site data 322. It should be appreciated that the well site parameter measurements in this example may be obtained by data manager 312 directly from a sensor or associated device itself. For example, such a sensor device may be in the form of a MWD tool with one or more downhole sensors and a surface component including a memory for storing downhole measurements collected by the sensors and a network interface for transferring the collected measurements to system 300 or other computing devices via network 302.

Examples of well site parameters for which measurements may be obtained include, but are not limited to, environmental parameters, directional drilling parameters and formation evaluation parameters. Such parameters may include, for example and without limitation, downhole pressure, downhole temperature, the resistivity or conductivity of the drilling mud and earth formations, the density and porosity of the earth formations, as well as the orientation of the wellbore. Examples of sensors that may be used to measure such parameters include, but are not limited to, a resistivity sensor, a nuclear porosity sensor, a nuclear density sensor, a magnetic resonance sensor, and a directional sensor package. In addition, formation fluid samples and/or core samples may be extracted from the formation using formation tester.

In an embodiment, well site data 322 may further include data related to different personnel and activities performed by the personnel during the drilling operation at the well site in this example. Such personnel may include, for example, different employees of a drilling rig operator or other service provider at the well site. The personnel data obtained from the well site may include, for example, data identifying a particular employee who performed an activity related to the drilling operation at the well site and when the activity was performed by that employee. In an example, such personnel data may be based in part on operating reports entered by a rig operator at the well site during different stages of the drilling operation.

In an embodiment, event detector 314 may monitor values of one or more well site parameters over a period of time during the drilling operation, based on well site data 322 obtained by data manager 312. The time period may correspond to, for example, a current run of a drill string within a borehole being drilled at the well site. Event detector 314 may use the monitored values to detect at least one event of interest during the current time period in this example. Event detector 314 may detect the event by, for example, comparing the monitored values of one or more well site parameters with a corresponding event definition. The event definitions for a plurality of detectable events may be stored in memory 320 as event data 324. Each event definition may include, for example, predefined criteria related to the values of one or more well site parameters.

In some implementations, each event may be defined by a unique combination of parameter behaviors. For example, a well site parameter can correspond to a single drilling property or a ratio, product, difference, sum or other function of data related to multiple drilling properties. During the drilling operation, the drilling properties are sensed over time, either continuously or intermittently. Thus, data related to the drilling properties is available over time, and the behavior of a corresponding well site parameter can be evaluated in real time. The definitions of different events of interest may therefore be based on various criteria relating to how values of one or more well site parameters or drilling properties change over time, e.g., whether each parameter or property is increasing, decreasing, remaining substantially the same, remaining within a certain range, exceeding a maximum, falling below a minimum, etc. In addition, a series of events may provide an indication that another event is likely to occur soon after the last event in the series or any time after the last event within the time period of interest, e.g., during a current run of the drill string. Thus, one or more prior events can be used as a source of data for determining if another event will occur.

Examples of different events and types of events that may be detected include, but are not limited to, a kick (influx), partial fluid loss, total fluid loss, standpipe bleed down, plugged choke, washed out choke, poor hole cleaning (wellbore packed off about drill string), downhole crossflow, wellbore washout, under gauged wellbore, drilling break, ballooning while circulating, ballooning while mud pump is off, mud pump overflow, stuck pipe, twisted off pipe, back off, plugging of bit nozzle, bit nozzle washed out, leak in surface processing equipment, rig pump failure, backpressure pump failure, downhole sensor failure, washed out drill string, non-return valve failure, start of drill pipe connection, drill pipe connection finished, etc.

Additionally, each event may indicate a different mode of operation of the one or more systems being monitored during the drilling operation. Examples of such events and operational modes include, but are not limited to, events indicating normal system operation in which the system(s) being monitored are operating within normal operating parameters, events indicating a non-critical failure in which a failure not critical to the operation of the oil field system (e.g., a failure in a mud analysis system) has occurred, critical failure events indicating that a failure critical to the operation of the oil field system (e.g., a failure of the mud circulation system) has occurred, and total failure or safety critical events indicating that a total failure that threatens the health of the rig or safety of the personnel at the rig site (e.g., an explosion that destroys the control room) has occurred.

In an embodiment, the relevant parameters and criteria for an event may be specified by a user 305 via GUI 330. For example, GUI 330 may provide a list of various drilling properties or well site parameters, which user 305 can select as desired for defining a particular event of interest. The drilling properties may be presented in the form of selectable options in a menu or other type of user interface (UI) control, which user 305 can manipulate using a user input device (e.g., a keyboard, touch-screen, mouse or other type of pointer device). Once a set of well site parameters has been selected for an event in this example, user 305 may specify the criteria for each parameter using additional UI controls presented in GUI 330, e.g., by specifying a range of desired parameter values representing normal operation or minimum and maximum values defining the boundaries or limits for such a range. In some implementations, GUI 330 may be used to provide similar UI controls for a list of predefined events. For example, a portion of GUI 330 may be used to display the predefined events as a list of options that are individually selectable by user 305 using the user input device. By selecting one or more options in the displayed list via GUI 330, user 305 can specify the corresponding event(s) of interest to be detected during the drilling operation or portion thereof. Each predefined event may include one or more associated well site parameters, for which user 305 can specify respective criteria, as described above.

In an embodiment, data visualizer 316 may use GUI 330 to provide an interactive timeline visualization of each event of interest detected over a current time period during the drilling operation. As described above, the current time period may correspond to a current run of a drill string within a borehole being drilled at the well site. Thus, GUI 330 may be used to provide an interactive timeline visualization of events detected for different runs of a drill string during a drilling operation at a well site. In an embodiment, the timeline visualization may include an "event marker" or visual indication of when each detected event of interest occurred during the current run of the drill string relative to other runs of the drill string during the drilling operation. For example, such an event marker may be displayed within a portion of the timeline visualization of events for the current run relative to other runs of the drill string. The other runs of the drill string may include, for example, runs preceding the current run or planned runs of the drill string following the current run. Each run in this example may correspond to a different time period of the overall drilling operation.

Examples of such a timeline visualization of events are shown in FIGS. 4-8. The examples in FIGS. 4-8 will be described below in the context of a well site data monitoring application for monitoring drilling operations at one or more well sites in a petroleum field, as described above. However, embodiments are not intended to be limited thereto. FIGS. 4-8 may illustrate, for example, different views of a timeline visualization of events as it is presented to a user via a GUI, e.g., GUI 330 of FIG. 3, as described above, of the wellsite data monitoring application executable at the user's computing device. In an example, the GUI may be in the form of a dashboard for viewing processed wellsite data related to various activities or events of interest that may occur during the drilling operation. Accordingly, the timeline visualization in this example may be displayed within an interactive dashboard window of the GUI. The dashboard window may be, for example, a dedicated event monitoring window displayed within a portion of the GUI (e.g., within a panel of a main GUI window). Further, the dashboard window may be one of various windows displayed within the GUI for presenting information related to the drilling operation, particularly with respect to various drilling parameters of interest that may change over the course of the drilling operation.

As will be described in further detail below, the GUI may enable the user to interact directly with the timeline visualization to view and analyze different types of information stored over a current time period of a drilling operation at a well site. In an embodiment, the current time period may be a current run of a drill string within a borehole being drilled at the well site, and the timeline visualization may be used to present a graphical representation of the stored wellsite information and various events of interest detected during the current run of the drill string.

Figure 4:
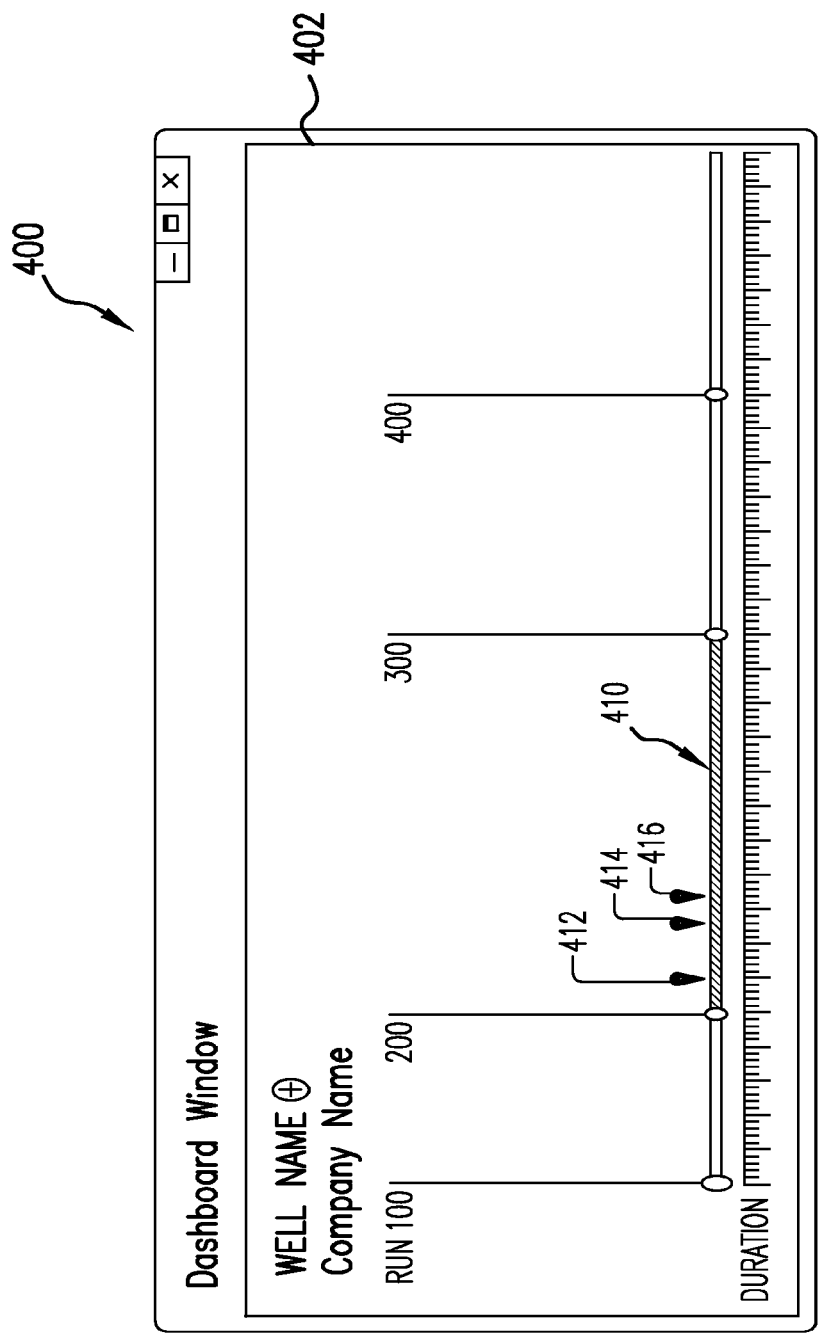
FIG. 4 is a view of an exemplary timeline visualization of events presented within an interactive graphical user interface (GUI) for displaying information related to different runs of a drill string during a drilling operation at a well site.

FIG. 4 is a view 400 of an exemplary timeline visualization 402 of events detected during a current run of a drill string at the well site. As described above, timeline visualization 402 may be presented to a user within an interactive dashboard window of a GUI, e.g., GUI 330 of FIG. 3, displayed for a wellsite monitoring application executable at the user's computing device. As shown in the example of FIG. 4, timeline visualization 402 includes multiple segments corresponding to different runs of the drill string.

For example, a timeline segment 410 may correspond to a current run of the drill string. Segment 410 and other segments of timeline visualization 402 may be displayed relative to an expected duration of the overall drilling operation, e.g., as represented by the x-axis of timeline visualization 402. In an embodiment, a visual indication or event marker may be displayed for any events of interest detected during each of the runs. Thus, event markers 412, 414 and 416 may be displayed in timeline segment 410 for various events of interest detected during the current run of the drill string. The events corresponding to event markers 412, 414 and 416 may be, for example, different types of events or different occurrences of the same type of event detected during the current run. In an embodiment, the visual properties of event markers 412, 414 and 416 may be varied based on the type of event corresponding to each event marker. Examples of visual properties that may be varied include, but are not limited to, each event marker's shape, color, size or any combination thereof. In an example, events that indicate a safety critical condition could be displayed in yellow or red hue and incorporate motion (when active) to draw the user's attention to a safety critical condition.

Figure 5:
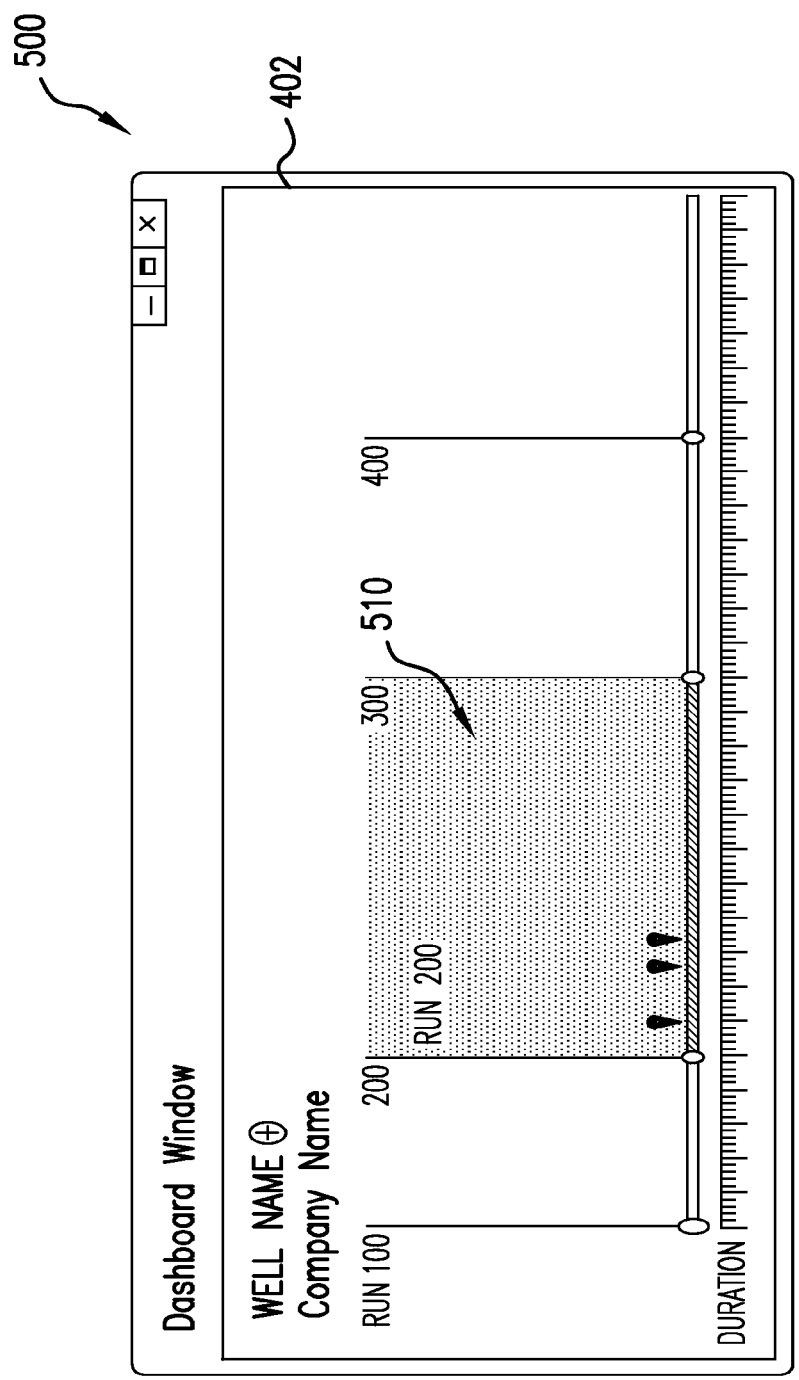
FIG. 5 is another view of the timeline visualization of FIG. 4, in which a current run of the drill string is highlighted based on input from a user.

Additionally, other visualization techniques may be used to distinguish the current run from other runs of the drill string. For example, FIG. 5 shows an exemplary view 500 of timeline visualization 402 of FIG. 4, as described above. In view 500 of FIG. 5, timeline visualization 402 is shown with shading to highlight an area 510 of the timeline corresponding to the current run of the drill string. It should be noted that any of various types of visualization techniques may be used to highlight or distinguish the current run or other runs of the drill string as desired for a particular implementation.

Figure 6:
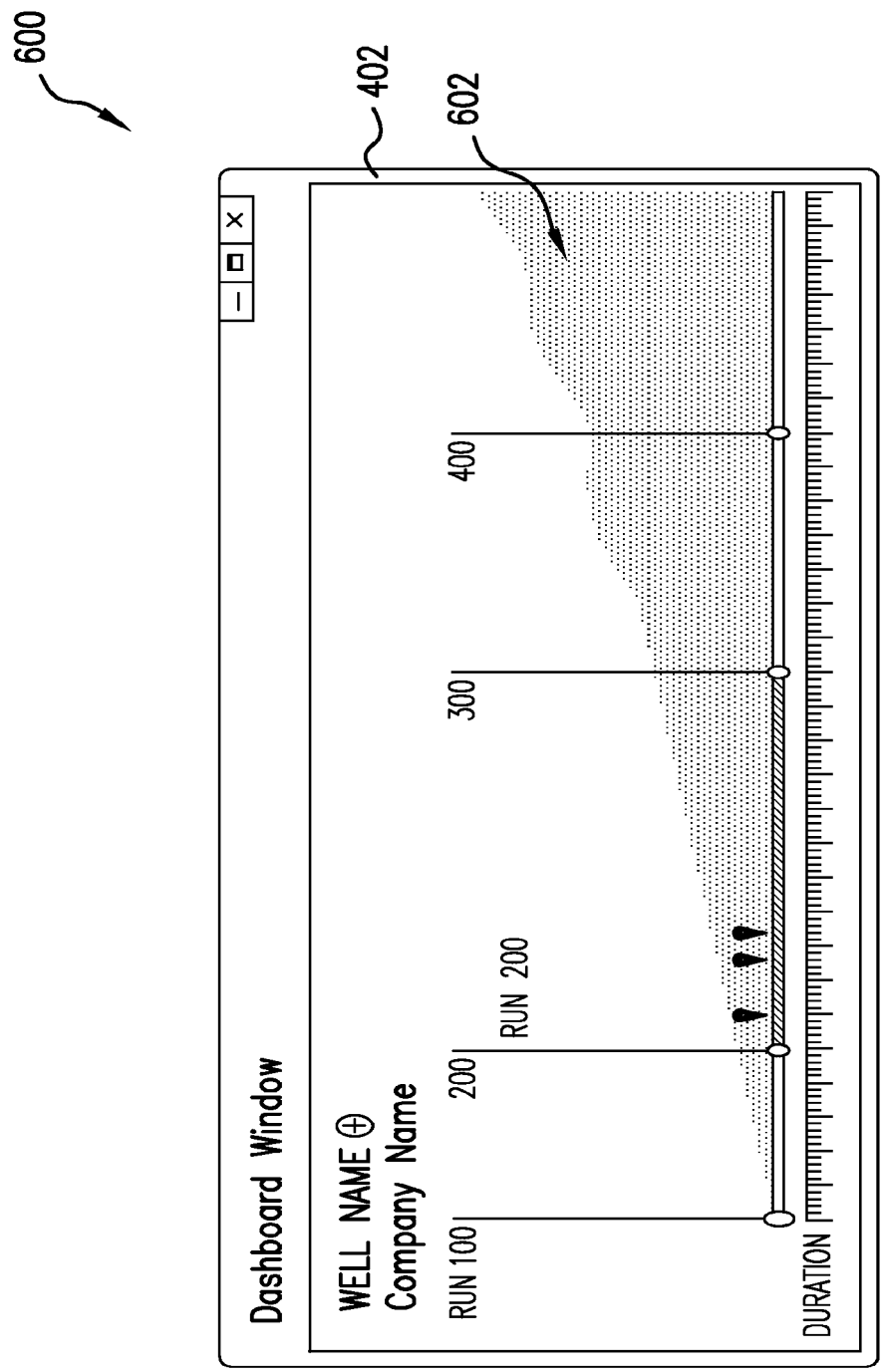
FIG. 6 is yet another view of the timeline visualization, in which the timeline visualization of events is provided as an overlay on a chart of selected well site data relevant to the drilling operation.

In an embodiment, timeline visualization 402 may be further updated to display an underlying chart for presenting selected data relevant to the drilling operation, as shown in FIG. 6. FIG. 6 shows an exemplary view 600 of timeline visualization 402 with a chart 602 that is displayed in the background. Chart 602 may be, for example, a graphical representation of a selected drilling parameter, such as rate of penetration (ROP) or depth of the drill bit, over the duration of the drilling operation. However, it should be appreciated that the disclosed embodiments are not intended to be limited thereto and that embodiments may be applied to any drilling parameter of interest. It should also be appreciated that embodiments are not limited to a single drilling parameter and that representations of multiple drilling parameters (e.g., multiple charts) may be displayed. The representation(s) of the drilling parameter(s) in this example may be based on, for example, measured or estimated values of the drilling parameter(s) over the course of the drilling operation, e.g., during different runs of the drill string.

As shown in the example of FIG. 6, chart 602 is in the form of a shaded line chart. However, it should be appreciated that other types of charts may also be used to represent the drilling parameter of interest. In an embodiment, the type of chart that is displayed may be selected by the user from a predefined list of standard charts or chart types. For example, the user may be provided with an option, e.g., as an on/off toggle button, to enable or disable the display of chart 602 along with a list of available charts for different parameters of interest within a menu control or settings panel (not shown) of the GUI. The user may interact with the GUI to enable the display of chart 602 and also, to select the type of chart to be displayed and the parameter of interest to be used for the chart's contents.

Figure 7:
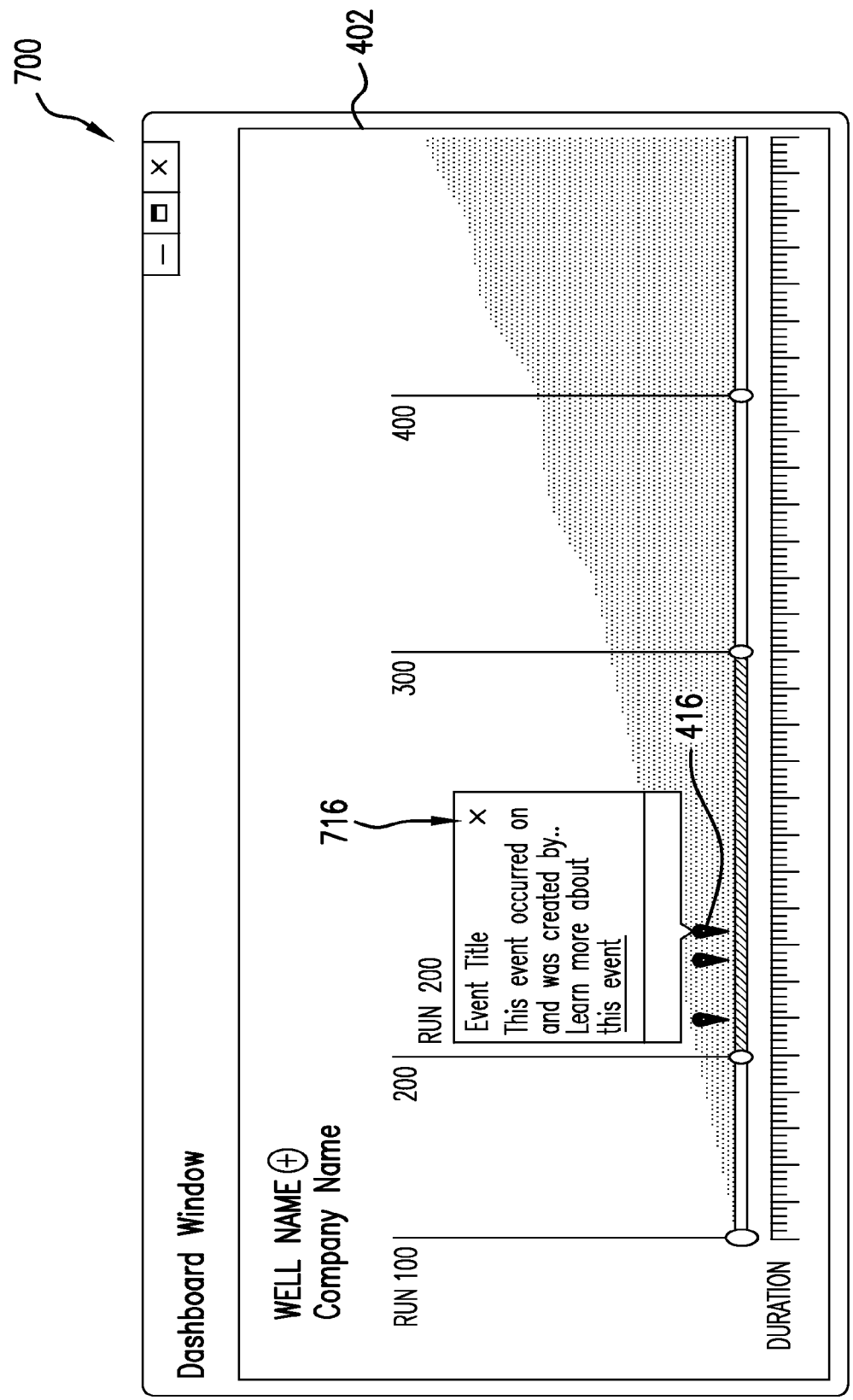
FIG. 7 is yet another view of the timeline visualization, in which the timeline visualization of events is provided with an event summary displayed for a selected event of interest.

In an embodiment, the user may also interact with the GUI to select a particular event marker within timeline visualization 402 to view additional information related to the corresponding event. FIG. 7 is an exemplary view 700 of timeline visualization 402 including an event details window 716. Event details window 716 may be, for example, an informational dialog or window displayed by the GUI in response to the user's selection of event marker 416 of timeline visualization 402. Similar informational dialogs may be displayed for other events in response to the user's selection of the corresponding event marker. The information displayed within event details window 716 may include, for example and without limitation, a date and time of when the event occurred and any other relevant information related to the particular type of event, e.g., information related to the personnel or wellsite location associated with a critical failure event. In addition, event details window 716 may include a link to additional information related to the event. The link may be, for example, a hyperlink that the user may select to open a webpage or other type of interface within a browser or other enterprise application for viewing the additional information.

Figure 8:
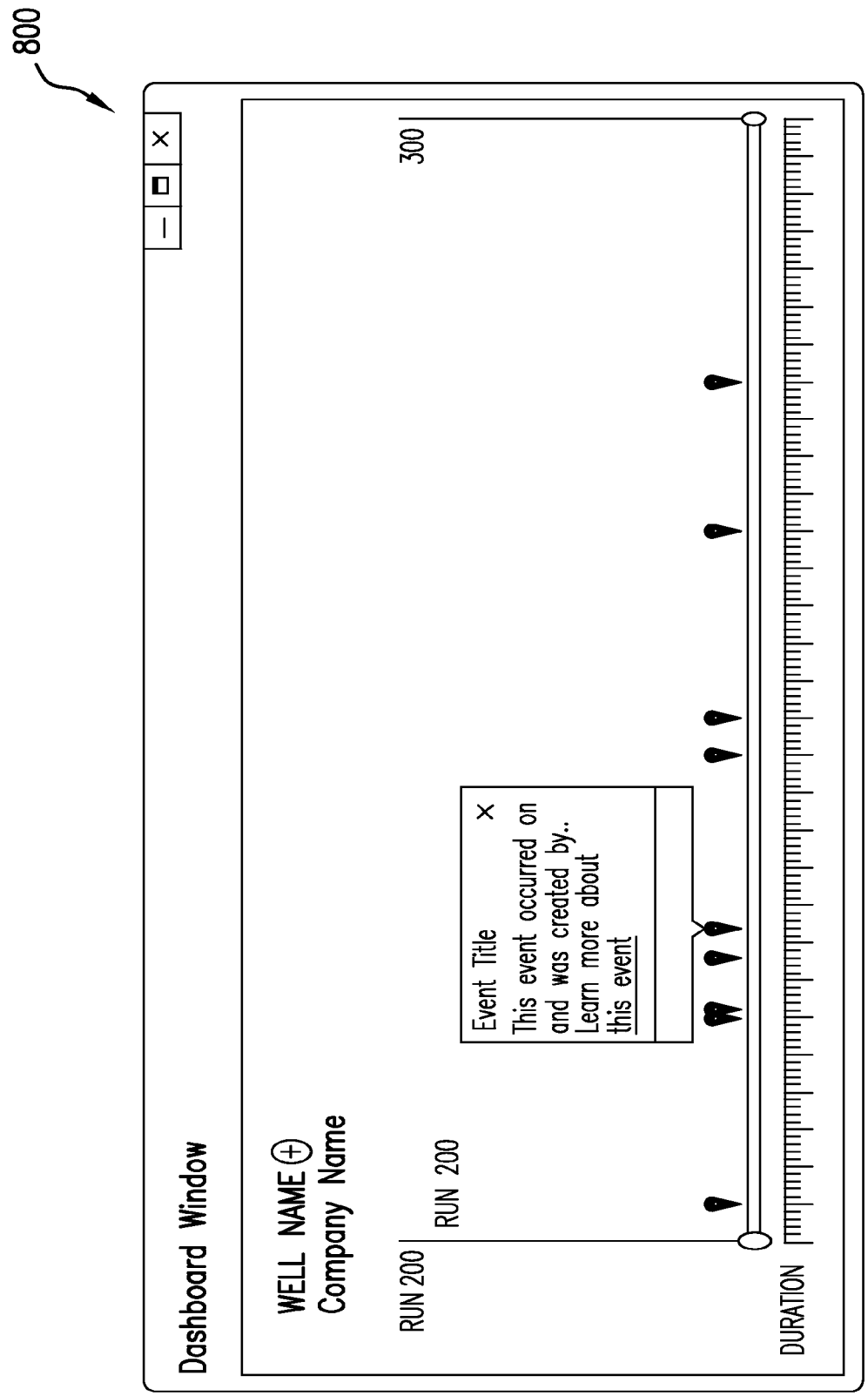
FIG. 8 is yet another view of the timeline visualization, in which the current run has been expanded to display additional event points across the timeline visualization.

FIG. 8 is yet another view 800 of timeline visualization 402, in which the current run has been expanded to display additional event markers for other events that were detected at various points during the current run. For example, view 800 may be displayed in response to the user's selection of the current run by double-clicking the physical left or right mouse button when the mouse pointer is within an area of timeline visualization 402 corresponding to the current run, e.g., area 510 of timeline visualization 402 as shown in view 500 of FIG. 5, as described above.

Figure 9:
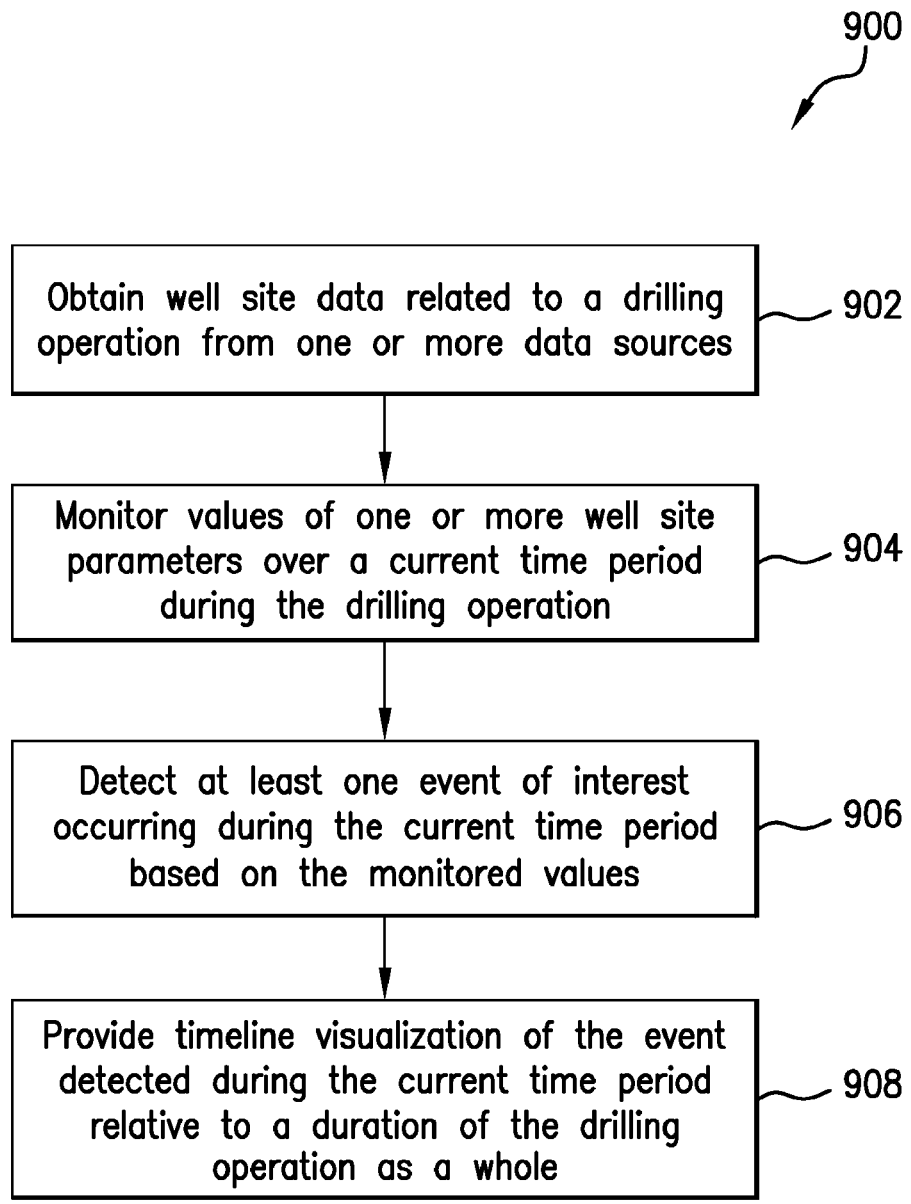
FIG. 9 is a process flowchart of an exemplary method for monitoring well site drilling operations using event detection and timeline visualization.

FIG. 9 is a process flowchart of an exemplary method 900 for monitoring well site drilling operations using event detection and timeline visualization. As shown in FIG. 9, method 900 includes steps 902, 904, 906 and 908. For purposes of discussion, method 900 will be described using network environment 100 of FIG. 1, as described above. However, method 900 is not intended to be limited thereto. Also, for purposes of discussion, method 900 will be described using system 300 of FIG. 3, as described above, but is not intended to be limited thereto.

Method 900 begins in step 902, which includes obtaining well site data related to a drilling operation from one or more data sources. Such data sources may include, for example, various downhole or surface sensors coupled to a drilling rig (e.g., any of drilling rigs 110A-110N of FIG. 1, as described above) at a wellsite. The sensors may be used to collect different types of data related to various drilling parameters of interest during a current time period of the drilling operation at the wellsite. As described above, the current time period may correspond to a current run of the drill string within a wellbore being drilled at the wellsite. In an embodiment, step 902 may also include obtaining definitions for one or more types of events associated with the current run of the drill string during the drilling operation. Such event definitions may include, for example, a set of predefined criteria for detecting one or more events of interest during the current time period, e.g., current run of the drill string, as described above. Step 902 may be performed by, for example, data manager 312 of FIG. 3, as described above.

In step 904, values of one or more wellsite parameters are monitored over a current time period during the drilling operation, based on the obtained well site data obtained in step 902. In step 906, at least one event of interest occurring during the current time period may be detected based on the monitored values. Step 906 may include, for example, identifying an occurrence of a drilling event at the well site based on the wellsite data and event definitions obtained in step 902. Steps 904 and 906 may be performed by, for example, event detector 314 of FIG. 3, as described above. In step 908, a timeline visualization of the event of interest detected during the current time period may be visualized relative to a duration of the drilling operation as a whole. As described above, the timeline visualization may be provided within an interactive GUI including a visual event marker indicating when each detected event of interest occurred during the current time period, e.g., current run of the drill string relative to other runs of the drill string during the drilling operation. Step 908 may be performed by, for example, data visualizer 316 of FIG. 3, as described above.

Figure 10:
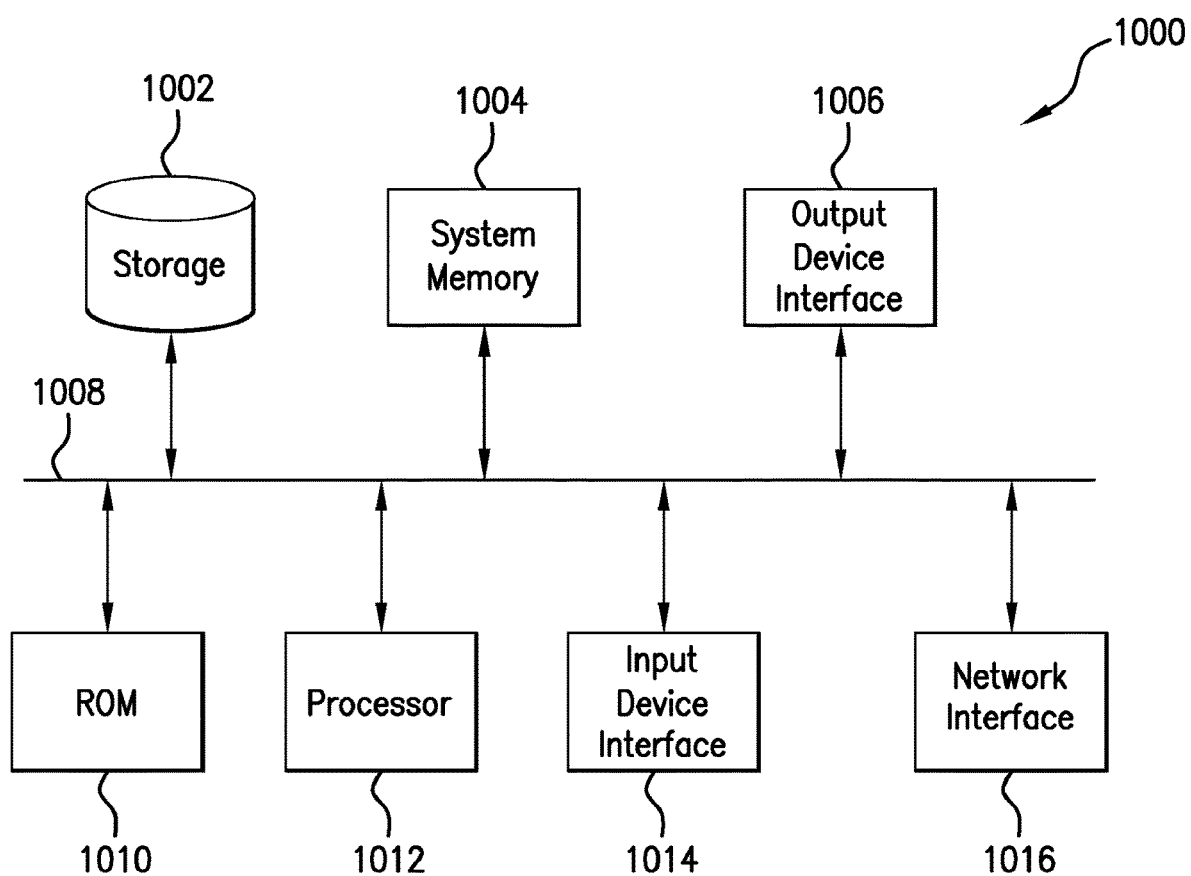
FIG. 10 is a block diagram of an exemplary computer system in which embodiments of the present disclosure may be implemented.

FIG. 10 is a block diagram of an exemplary computer system 1000 in which embodiments of the present disclosure may be implemented. For example, computing device 130A-N of FIG. 1 and system 300 of FIG. 3, as described above, may be implemented using system 1000. Also, for example, the steps of method 900 of FIG. 9, as described above, may be performed using system 1000. System 1000 can be a computer, workstation, server, smartphone, PDA or other type of electronic computing device. Such an electronic device includes various types of computer readable media and interfaces for various other types of computer readable media. As shown in FIG. 10, system 1000 includes a permanent storage device 1002, a system memory 1004, an output device interface 1006, a system communications bus 1008, a read-only memory (ROM) 1010, processing unit(s) 1012, an input device interface 1014, and a network interface 1016.

Bus 1008 collectively represents all system, peripheral, and chipset buses that communicatively connect the numerous internal devices of system 1000. For instance, bus 1008 communicatively connects processing unit(s) 1012 with ROM 1010, system memory 1004, and permanent storage device 1002.

From these various memory units, processing unit(s) 1012 retrieves instructions to execute and data to process in order to execute the processes of the subject disclosure. The processing unit(s) can be a single processor or a multi-core processor in different implementations.

ROM 1010 stores static data and instructions that are needed by processing unit(s) 1012 and other modules of system 1000. Permanent storage device 1002, on the other hand, is a read-and-write memory device. This device is a non-volatile memory unit that stores instructions and data even when system 1000 is off. Some implementations of the subject disclosure use a mass-storage device (such as a magnetic or optical disk and its corresponding disk drive) as permanent storage device 1002.

Other implementations use a removable storage device (such as a floppy disk, flash drive, and its corresponding disk drive) as permanent storage device 1002. Like permanent storage device 1002, system memory 1004 is a read-and-write memory device. However, unlike storage device 1002, system memory 1004 is a volatile read-and-write memory, such a random access memory. System memory 1004 stores some of the instructions and data that the processor needs at runtime. In some implementations, the processes of the subject disclosure are stored in system memory 1004, permanent storage device 1002, and/or ROM 1010. For example, the various memory units include instructions for computer aided pipe string design based on existing string designs in accordance with some implementations. From these various memory units, processing unit(s) 1012 retrieves instructions to execute and data to process in order to execute the processes of some implementations.

Bus 1008 also connects to input and output device interfaces 1014 and 1006. Input device interface 1014 enables the user to communicate information and select commands to the system 1000. Input devices used with input device interface 1014 include, for example, alphanumeric, QWERTY, or T9 keyboards, microphones, and pointing devices (also called "cursor control devices"). Output device interfaces 1006 enables, for example, the display of images generated by the system 1000. Output devices used with output device interface 1006 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 10, bus 1008 also couples system 1000 to a public or private network (not shown) or combination of networks through a network interface 1016. Such a network may include, for example, a local area network ("LAN"), such as an Intranet, or a wide area network ("WAN"), such as the Internet. Any or all components of system 1000 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of method 900 of FIG. 9, as described above, may be implemented using system 1000 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for field engineers, mud loggers, oil company representatives, and other users interested in monitoring the progress of a drilling operation. Accordingly, advantages of the present disclosure include, but not limited to, providing a capability to quickly view a visualization of the progress of the operation, key events, and key performance indicators. The disclosed embodiments are particularly advantageous in cases where a user needs to monitor multiple drilling operations at various wellsites simultaneously. The wellsite monitoring techniques disclosed herein may allow the user to quickly and easily understand the status and history of a drilling operation, and then, decide whether or not any actions need to be taken at the particular stage of the operation, e.g., to achieve a planned milestone or deal with an unexpected event that may have occurred.

In one embodiment of the present disclosure, a computer-implemented method of event detection and visualization for monitoring well site drilling operations includes: obtaining well site data related to a drilling operation from one or more data sources; monitoring values of one or more wellsite parameters over a current time period during the drilling operation, based on the obtained well site data; detecting at least one event of interest occurring during the current time period, based on the monitored values of the one or more well site parameters; and providing an interactive timeline visualization of the event of interest detected during the current time period relative to a duration of the drilling operation.

In a further embodiment, the one or more data sources include one or more sensors at the well site, and the data obtained from the data sources includes measurements of drilling properties collected by the one or more sensors at the well site. In yet a further embodiment, the monitored activities include activities by personnel associated with the drilling operation at the well site, and the data includes data related to the personnel at the well site during the current time period for the drilling operation. In yet a further embodiment, the current time period corresponds to a current run of a drill string within a borehole drilled at the well site, and the one or more events of interest are displayed within a portion of the timeline visualization corresponding to the current run relative to other runs of the drill string at different time periods during the drilling operation. In yet a further embodiment, the timeline visualization includes a visual marker indicating when each of the one or more events of interest occurred during the current run of the drill string. In yet a further embodiment, the timeline visualization is provided for display to a user via a graphical user interface (GUI) of a client application executable at a computing device of the user.

In yet a further embodiment, the above-described method further includes receiving, via the GUI of the client application executable at the user's computing device, input from the user selecting the event of interest to be detected during the drilling operation. In yet a further embodiment, the detected event is one a plurality of events selected by the user via the GUI. In yet a further embodiment, in addition to obtaining well site data, a definition including a set of predefined criteria for each of the plurality of events to be detected during the drilling operation is obtained, and an occurrence of at least one of the plurality of events during the current time period is identified based on the obtained well site data and the definition of each of the plurality of events.

In another embodiment of the present disclosure, a system includes at least one processor and a memory coupled to the processor having instructions stored therein, which when executed by the processor, cause the processor to perform functions including functions to: obtain well site data related to a drilling operation from one or more data sources; monitor values of one or more wellsite parameters over a current time period during the drilling operation, based on the obtained well site data; detect at least one event of interest occurring during the current time period, based on the monitored values of the one or more well site parameters; and provide an interactive timeline visualization of the event of interest detected during the current time period relative to a duration of the drilling operation.

In yet another embodiment of the present disclosure, a computer-readable storage medium has instructions stored therein, which when executed by a computer cause the computer to perform a plurality of functions, including functions to: obtain well site data related to a drilling operation from one or more data sources; monitor values of one or more wellsite parameters over a current time period during the drilling operation, based on the obtained well site data; detect at least one event of interest occurring during the current time period, based on the monitored values of the one or more well site parameters; and provide an interactive timeline visualization of the event of interest detected during the current time period relative to a duration of the drilling operation.

While specific details about the above embodiments have been described, the above hardware and software descriptions are intended merely as example embodiments and are not intended to limit the structure or implementation of the disclosed embodiments. For instance, although many other internal components of the system 1000 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A computer-implemented method of event detection and visualization for monitoring well site drilling operations, the method comprising:
    obtaining well site data related to a drilling operation from one or more data sources;
    monitoring values of one or more operating parameters of a drilling system over a current time period during the drilling operation, based on the obtained well site data;
    detecting an event of interest associated with the drilling system during the current time period, based on the monitored values of the one or more operating parameters;
    determining an operational mode of the drilling system for the current time period, based on the detected event of interest, wherein the operational mode is at least one of a normal operation, a non-critical failure, or a critical failure; and
    responsive to determining that the operational mode is a critical failure of the drilling system:
        determining when at least one other event of interest that corresponds to a different operational mode of the drilling system is likely to occur after the detected event of interest; and
        providing an interactive timeline visualization of the detected event of interest and the at least one other event of interest relative to a duration of the drilling operation, wherein the interactive timeline visualization includes an event marker with visual properties that vary depending on the operational mode of the drilling system, and the event marker displays information related to the detected event of interest, the information including personnel data identifying at least one employee who performed an activity related to the drilling operation during the current time period associated with the detected event of interest.

2. The method of claim 1, wherein the one or more data sources include one or more sensors at the well site, and the data obtained from the data sources includes measurements of drilling properties collected by the one or more sensors at the well site.

3. The method of claim 1, wherein the one or more data sources comprise an operating report including data related to personnel who performed at least one activity at the well site over the duration of the drilling operation, and wherein the monitored values comprise:
    data identifying each employee who performed at least one activity related to the drilling operation during the current time period associated with the detected event of interest and when the at least one activity was performed by that employee.

4. The method of claim 1, wherein the current time period corresponds to a current run of a drill string within a borehole drilled at the well site, and the detected event of interest is one of a plurality of detected events of interest displayed within a portion of the timeline visualization corresponding to the current run relative to other runs of the drill string at different time periods during the drilling operation.

5. The method of claim 4, wherein the timeline visualization includes a visual marker indicating when each of the events of interest occurred during the current run of the drill string.

6. The method of claim 1, wherein the timeline visualization is provided for display to a user via a graphical user interface (GUT) of a client application executable at a computing device of the user.

7. The method of claim 6, further comprising:
    receiving, via the GUI of the client application executable at the user's computing device, input from the user selecting each event of interest to be detected during the drilling operation.

8. The method of claim 7, wherein the detected event is one a plurality of events selected by the user via the GUI.

9. The method of claim 8, wherein obtaining further comprises obtaining a definition including a set of predefined criteria for each of the plurality of events to be detected during the drilling operation, and
    wherein detecting further comprises identifying an occurrence of at least one of the plurality of events during the current time period based on the obtained well site data and the definition of each of the plurality of events.

10. A system comprising:
    at least one processor; and
    a memory coupled to the processor having instructions stored therein, which when executed by the processor, cause the processor to perform functions including functions to:
    obtain well site data related to a drilling operation from one or more data sources;
    monitor values of one or more operating parameters of a drilling system over a current time period during the drilling operation, based on the obtained well site data;
    detect an event of interest associated with the drilling system during the current time period, based on the monitored values of the one or more operating parameters;
    determine an operational mode of the drilling system for the current time period, based on the detected event of interest, wherein the operational mode is at least one of a normal operation, a non-critical failure, or a critical failure; and
    responsive to a determination that the operational mode is a critical failure of the drilling system:
        determine when at least one other event of interest that corresponds to a different operational mode of the drilling system is likely to occur after the detected event of interest; and
        provide an interactive timeline visualization of the detected event of interest and the at least one other event of interest relative to a duration of the drilling operation, wherein the interactive timeline visualization includes an event marker with visual properties that vary depending on the operational mode of the drilling system, and the event marker displays information related to the detected event of interest, the information including personnel data identifying at least one employee who performed an activity related to the drilling operation during the current time period associated with the detected event of interest.

11. The system of claim 10, wherein the one or more data sources include one or more sensors at the well site, and the data obtained from the data sources includes measurements of drilling properties collected by the one or more sensors at the well site.

12. The system of claim 10, wherein the one or more data sources comprise an operating report including data related to personnel who performed at least one activity at the well site over the duration of the drilling operation, and wherein the monitored values comprise:
  data identifying each employee who performed at least one activity associated with the detected event and when the at least one activity was performed by that employee.

13. The system of claim 10, wherein the current time period corresponds to a current run of a drill string within a borehole drilled at the well site, and the detected event of interest is one of a plurality of detected events of interest displayed within a portion of the timeline visualization corresponding to the current run relative to other runs of the drill string at different time periods during the drilling operation.

14. The system of claim 13, wherein the timeline visualization includes a visual marker indicating when each of the events of interest occurred during the current run of the drill string.

15. The system of claim 10, wherein the timeline visualization is provided for display to a user via a graphical user interface (GUI) of a client application executable at a computing device of the user.

16. The system of claim 15, wherein the functions performed by the processor further include functions to:
  receive, via the GUI of the client application executable at the user's computing device; input from the user selecting each event of interest to be detected during the drilling operation.

17. The system of claim 16, wherein the detected event is one a plurality of events selected by the user via the GUI.

18. The system of claim 17, wherein the functions performed by the processor further include functions to:
  obtain a definition including a set of predefined criteria for each of the plurality of events to be detected during the drilling operation; and
  identify an occurrence of at least one of the plurality of events during the current time period based on the obtained well site data and the definition of each of the plurality of events.

19. A non-transitory computer-readable storage medium having instructions stored therein, which when executed by a computer cause the computer to perform a plurality of functions, including functions to:
  obtain well site data related to a drilling operation from one or more data sources;
  monitor values of one or more operating parameters of a drilling system over a current time period during the drilling operation, based on the obtained well site data;
  detect an event of interest related to an operation of the drilling system during the current time period, based on the monitored values of the one or more operating parameters;
  determine an operational mode of the drilling system for the current time period, based on the detected event of interest, wherein the operational mode is at least one of a normal operation, a non-critical failure, or a critical failure; and
  responsive to a determination that the operational mode is a critical failure of the drilling system:
    determine when at least one other event of interest that corresponds to a different operational mode of the drilling system is likely to occur after the detected event of interest; and
    provide an interactive timeline visualization of the detected event of interest and the at least one other event of interest relative to a duration of the drilling operation, wherein the interactive timeline visualization includes an event marker with visual properties that vary depending on the operational mode of the drilling system, and the event marker displays information related to the detected event of interest, the information including personnel data identifying at least one employee who performed an activity related to the drilling operation during the current time period associated with the detected event of interest.

20. The non-transitory computer-readable storage medium of claim 19, wherein the current time period corresponds to a current run of a drill string within a borehole drilled at the well site, and the detected event of interest is one of a plurality of detected events of interest displayed within a portion of the timeline visualization corresponding to the current run relative to other runs of the drill string at different time periods during the drilling operation.

* * * * *

UNITED STATES PATENT AND TRADEMARK OFFICE
CERTIFICATE OF CORRECTION

PATENT NO. : 11,021,949 B2  
APPLICATION NO. : 15/557051  
DATED : June 1, 2021  
INVENTOR(S) : Michael J. Davila, Dorinne D. Hammons and Ron Vutpakdi Page 1 of 1

It is certified that error appears in the above-identified patent and that said Letters Patent is hereby corrected as shown below:

In the Specification

Column 7, Line 37, change "110 interface" to -- I/O interface --

In the Claims

Column 20, Line 15, in Claim 6, change "(GUT)" to -- (GUI) --

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*